United States Patent
Karr (10) Patent No.: US 7,188,125 B1
(45) Date of Patent: Mar. 6, 2007

(54) REPLICATION USING A SPECIAL OFF-HOST NETWORK DEVICE

(75) Inventor: Ronald S. Karr, Palo Alto, CA (US)

(73) Assignee: Veritas Operating Corporation, Mountain View, CA (US)

( * ) Notice: Subject to any disclaimer, the term of this patent is extended or adjusted under 35 U.S.C. 154(b) by 441 days.

(21) Appl. No.: 10/326,445

(22) Filed: Dec. 19, 2002

(51) Int. Cl.
  *G06F 17/30* (2006.01)
  *G06F 15/16* (2006.01)

(52) U.S. Cl. ............... 707/204; 707/200; 709/226

(58) Field of Classification Search ............... 707/204; 711/162; 714/5, 6
  See application file for complete search history.

(56) References Cited

U.S. PATENT DOCUMENTS

| | | | |
|---|---|---|---|
| 5,819,020 A * | 10/1998 | Beeler, Jr. ................. | 714/5 |
| 6,324,654 B1 * | 11/2001 | Wahl et al. ................ | 714/6 |
| 6,816,951 B2 * | 11/2004 | Kimura et al. ............. | 711/162 |
| 2002/0078315 A1 * | 6/2002 | Howard et al. ............ | 711/162 |
| 2003/0037108 A1 * | 2/2003 | Peiffer et al. ............. | 709/203 |
| 2003/0158998 A1 * | 8/2003 | Smith ....................... | 711/112 |
| 2004/0220951 A1 * | 11/2004 | Howard et al. ............ | 707/100 |

* cited by examiner

*Primary Examiner*—Jeffrey Gaffin
*Assistant Examiner*—Hassan Mahmoudi
(74) *Attorney, Agent, or Firm*—Campbell Stephenson Ascolese LLP (57) ABSTRACT

Disclosed is a method and apparatus for replicating a data volume using a network appliance. In one embodiment, a first node transmits a first write-data transaction to a first data storage system and to the network appliance. A second node transmits a second write-data transaction to the first data storage device and to the network appliance. The network appliance transmits the first and second write-data transactions to a third node via a communication link for updating a replica of a data volume. The data volume is stored in the first data storage system and is updated with first and second data contained in the first and second write-data transactions, respectively. The replica of the data volume is stored in a second data storage system and is updated with the first and second data.

19 Claims, 3 Drawing Sheets

REPLICATION USING A SPECIAL OFF-HOST NETWORK DEVICE

BACKGROUND OF THE INVENTION

Many businesses such as insurance companies, banks, brokerage firms, etc., rely heavily on data processing systems for storing and processing business data. Often the viability of a business depends on reliable access to valid data contained within its data processing system. As such, businesses seek reliable ways to consistently protect their data processing systems and the data contained therein from natural disasters, acts of terrorism, or computer hardware and/or software failures.

Businesses must have plans in place to recover quickly after, for example, a data volume is corrupted by hardware failure, software failure, or site failure. These plans often involve creating a tape backup copy of the data volume that is sent offsite. A corrupted data volume can be restored from the tape backup or offsite tapes can used to reconstruct the data volume at a second location so that business can resume at the second location. Even with the most well-executed backup strategy, restoring data from tape is typically a time consuming process that results in data that is too old. For many businesses, the delay in restoring a data volume from a tape backup copy and the age of data is unacceptable. The need to recover quickly to a recent state from often requires businesses to employ real-time replication of data. Real-time replication enables rapid recovery when compared to conventional bulk data transfer from sequential media, and is much more current than periodic backups sent offsite.

Figure 1:
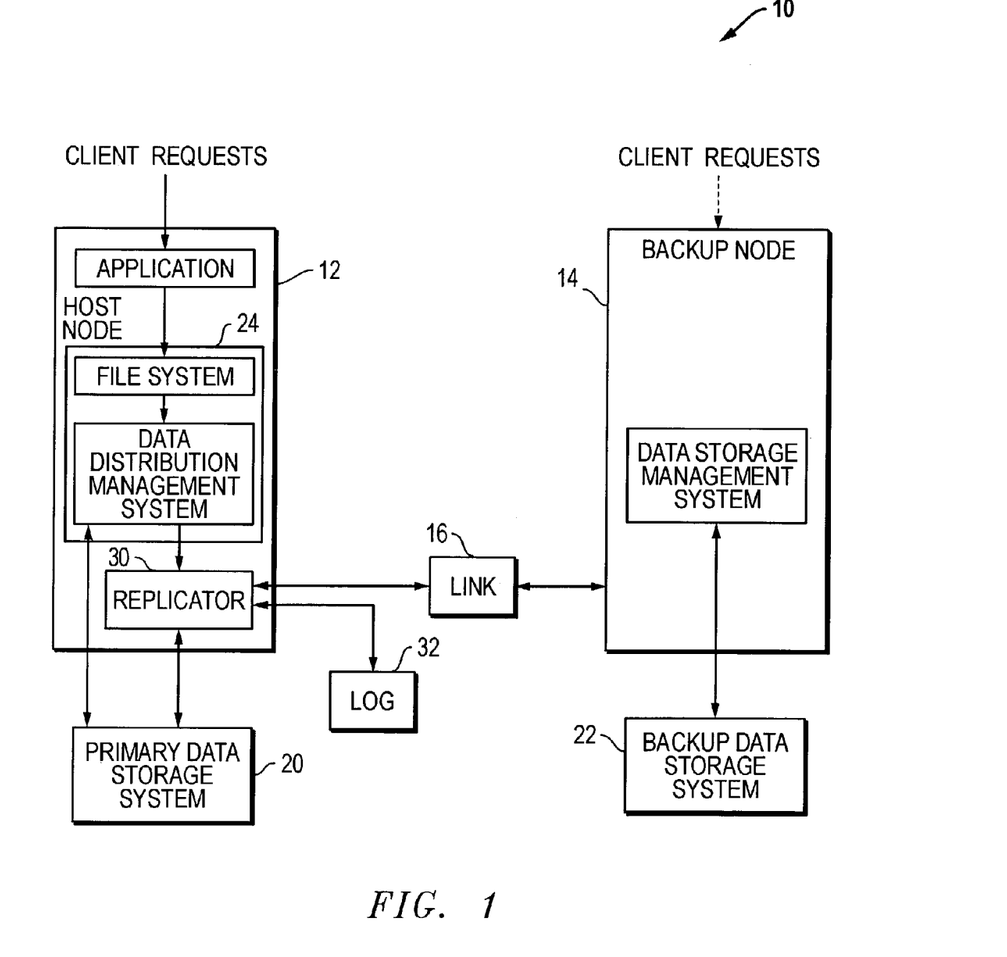
FIG. 1 is a block diagram of a data processing system employing a replicator.

FIG. 1 illustrates an exemplary data processing system 10 that employs data replication as a means for protecting critical data and enabling rapid recovery. Data processing system 10 includes a host node 12 coupled to a backup node 14 via a data communication link 16. Additionally, the data processing system 10 shown in FIG. 1 includes primary and backup data storage systems 20 and 22, respectively, coupled to host and backup nodes 12 and 14, respectively. Primary data storage system 20 stores the contents of a primary data volume, while backup data storage system 22 stores a copy or replica of the primary data volume. Primary and backup data storage systems 20 and 22, respectively, may include several memory devices such as magnetic or optical disc arrays. Data of the primary volume is stored in a distributed fashion across the several memory devices of primary data storage system 20. Similarly, data of the replica is stored in a distributed fashion across the several memory devices of backup data storage system 22.

Host node 12 may take the form in a server computer system that receives requests from client computer systems (not shown). More particularly, the requests are received and processed by an application executing on host node 12. In response to processing the requests, host node 12 may generate read or write-data transactions that read data from or write data to the primary data volume of storage system 20. Primary data storage system 20 may return data to the host node 12 for subsequent application processing in response to primary data storage system 20 receiving a read data transaction. Or primary data storage system 20 returns an acknowledgement to the host node 12 that data has been successfully stored in primary data storage system 20 in response to receiving a write-data transaction.

Backup data storage system 22, as noted below, stores a replica of the primary data volume stored in primary data storage system 20. Backup node 14 may also be a server computer system that executes the same application executing on host node 12. The application running on backup node 14 can receive and process requests from client computer systems (not shown). Backup node 14 and backup data storage systems, as their names imply, provide a backup source to service client computer system requests should host node 12 and/or primary data storage system 20 become unusable or inaccessible due to some event such as hardware failure, software failure, or site failure. When host node 12 and/or primary data storage system 20 suddenly become unusable or inaccessible, client computer system requests can be diverted to backup node 14 for subsequent processing, after relatively quick application or file system revovery.

First node 12 includes a data storage management system 24 that takes form in instructions executing on one or more processors within first node 12. Data management system 24 may include a file system and a system for managing the distribution of the primary volume data across the several memory devices of primary data storage system 20. Volume Manager™ provided by VERITAS Software Corporation of Mountain View, Calif., is an exemplary system for managing the distribution of volume data across memory devices. Data storage management systems 24 generates read and write-data transactions described above in response to host node 12 receiving and processing requests from client computer systems.

Host node 12 also includes a data volume replicator 30 that takes form in instructions executing on one or more processors of host node 12. Replicator 30 functions to create a real-time replica of the primary data volume in primary data storage system 20. The replica is created and maintained in backup data storage system 22.

Replicator 30 receives a copy of each write-data transaction generated by data storage management system 24. Replicator 30 can store the received write-data transactions in write transaction log 32. Write transaction log 32 may or may not be a component of the primary data storage system 20. For purposes of explanation, write transaction log 32 will be considered a component within primary data storage system 20.

Replicator 30 processes and eventually transmits logged write-data transactions to backup node 14 via communication link 16. Communication link 16 can be any kind of messaging network, such as an IP link. For purposes of explanation, communication link 16 will take form in a wide-area network (WAN) link. Backup node 14 receives the write transactions, and the replicated volume in backup data storage system 22 is subsequently updated (i.e., data is written to the replicated data volume) in response to backup node 14 receiving the write-data transactions. In this fashion, a near real-time replica of the primary data volume within primary data storage system 20 is maintained within backup data storage system 22.

Replicator 30, in addition to performing other functions, can order dependent write-data transactions before dependent write-data transactions are transmitted to backup node 14. First and second write-data transactions are dependent if the first write-data transaction must be completed at data storage system 22 before the second write-data transaction can begin at data storage system 22. As an aside, the first write-data transaction must be completed at data storage system 20 before the second write-data transaction can begin at data storage management system 20. If the second write-data transaction completes before the first write-data transaction, the primary data volume of data storage system 20 and/or the primary data volume replica of data storage system 22 may become corrupted or otherwise internally inconsistent.

Replicator 30 can order dependent write-data transactions in a variety of ways. In one embodiment, replicator 30 orders dependent write-data transactions by assigning sequence numbers thereto. For example, a write-data transaction dependent on an earlier generated write-data transaction is assigned a sequence number that is greater then the sequence number assigned to the earlier generated write-data transaction. The sequence numbers define the order in which write-data transactions are to be completed; those write-data transactions assigned lower sequence numbers are to be completed before write-data transactions that are assigned higher sequence numbers. The sequence numbers are transmitted to data storage system 22 with their assigned sequence numbers to insure that the primary data volume replica in backup data storage system 22 is updated in proper order during asynchronous replication as will be more fully described below. Again, if the primary data volume replica is not updated in order, the replica may store data that is inconsistent with the primary data volume in primary data storage system 20.

Synchronous replication achieves full data currentness in the replicated volume, but performance is affected by delay in transmission of dependent write-data transactions noted above. In other words, throughput of write-data transactions between replicator 30 and backup node 14 is slowed due to the transmission delay between dependent write-data transactions. If throughput of write-data transactions is slowed too much, replicator may not be able to maintain a real-time replica of the primary data volume without rendering the data volume unusable.

One solution to increase the throughput of write-data transactions between replicator 30 and backup node 14 is to use asynchronous replication. Replicator 30, as noted above, can assign sequence numbers to dependent write-data transactions stored in log 32. Replicator 30 can transmit dependent write-data transactions to backup node 14 along with their respectively assigned sequence numbers. In the asynchronous mode as opposed to synchronous mode, there is no delay in transmission of a dependent write-data transaction until a previously transmitted dependent write-data transaction has completed at backup node 14. Backup node 14 stores received dependent write-data transactions along with their assigned sequence numbers, and these dependent write-data transactions are stored at backup node 14 until backup node 14 updates the primary data volume replica in accordance with these write-data transactions. Because dependent write-data transactions are transmitted with their respectively assigned sequence numbers, dependent write-data transactions can be transmitted to or received by backup node 14 out of order. Asynchronous mode is not defined by the order of transmission, asynchronous mode is defined by the fact that the write-data transaction is considered complete before it is known to have been transmitted and received. Because the write-data transaction is considered complete before it is transmitted and received, the source of the write-data transactions is free to issue subsequent write-data transactions, including dependent write-data transactions.

Asynchronous operation increases the transmission throughput of write-data transactions between replicator 30 and backup node 14 since there is no delay in transmission of a dependent write data instruction to backup node 14 until a previously transmitted dependent write-data transaction completes at backup node 14. Due to the asynchronous nature of transmission over link 16, write-data transactions may be received out of order by backup node 14. However, backup node 14 processes received write-data transactions according to their assigned sequence numbers to insure proper updating of the replica volume. In particular, the replica in storage system 22 is updated by write-data transactions with lower sequence numbers assigned thereto before being updated by write-data transactions with higher sequence numbers assigned thereto.

Businesses design their data processing systems to respond to data read and write requests from client computer systems within the shortest amount of time possible. The time it takes host node 12 to respond to data read and write requests is inversely proportional to the number such requests received in a given period of time. In other words, if host computer system 12 is burdened with an increasingly large number of data read and write requests, the response time to the requests may reduce substantially.

Figure 2:
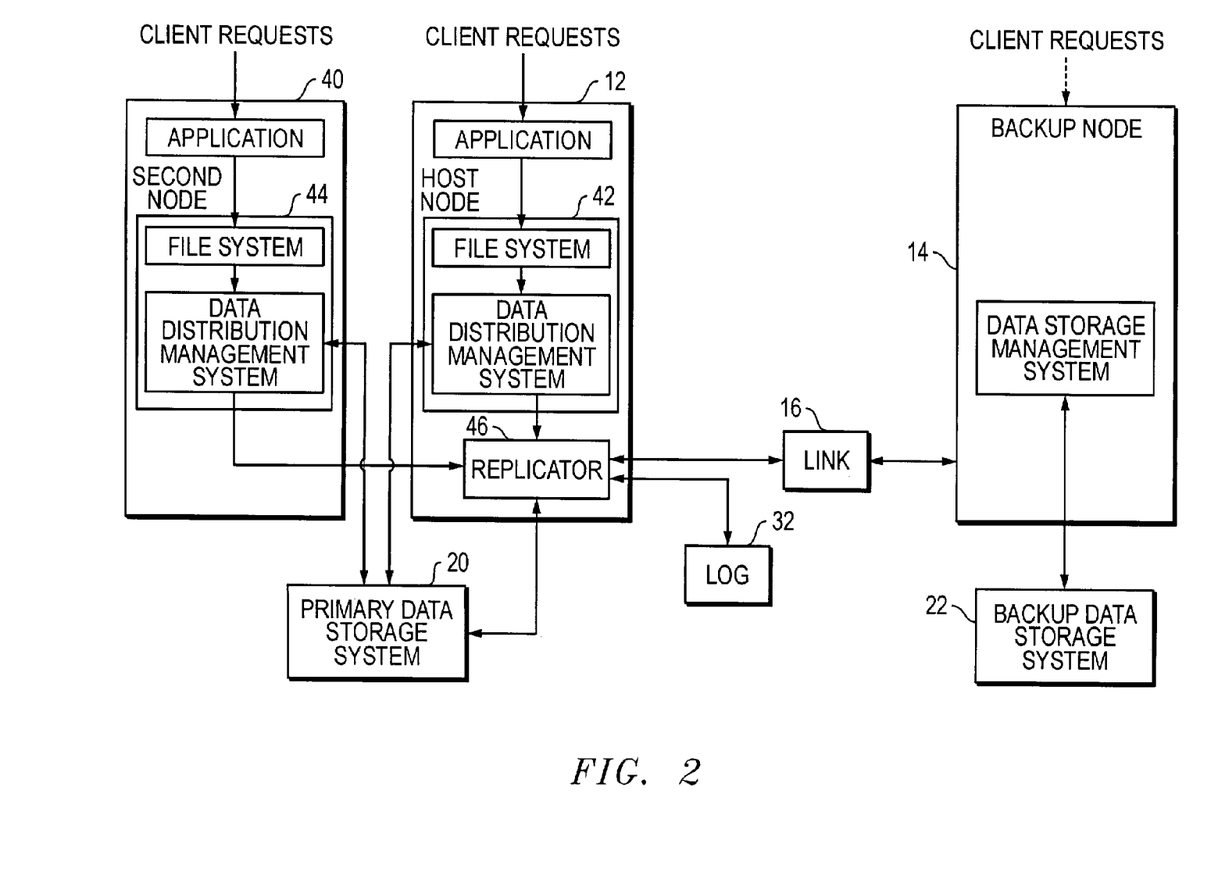
FIG. 2 is a block diagram of a data processing system of FIG. 1 with a secondary node added thereto.

To increase the response time, businesses often add a second node to their data processing systems to service data read and write requests from client computer systems. FIG. 2 illustrates the data processing system 10 of FIG. 1 expanded to include a second node 40 coupled to primary data storage system 20. The data volume stored within primary data storage system 20 is shared by host node 12 and second node 40. Second node 40 receives data read and write requests from client computer systems coupled thereto.

In FIG. 2, host node 12 and second node 40 execute data storage management systems 42 and 44, respectively. Data storage management systems 42 and 44 are components of a distributed data storage management system. Data storage management system 44 takes form in software instructions executed on one or more processors of second node 40, while data storage management system 42 takes form in software instructions executed on one or more data processors of first node 12. Data storage management systems 42 and 44 generate write-data transactions in response to receiving and processing data write requests from client computer systems. It should be understood that the data processing system shown in FIG. 2 and its description should not be considered prior art to the invention described or claimed herein.

The replicated volume in data storage system 22 should be updated with data of write-data transactions generated by both data storage management systems 42 and 44. Second node 40 lacks a replicator. As such, write-data transactions generated by data storage management system 44 of second node 40, are provided to replicator 46 of host node 12. Replicator 46, like replicator 30 of FIG. 1, takes form in software instructions executing on the one or more processors of host node 12. Replicator 46 stores all write-data transactions, including those generated by data storage management systems 42 and 44, in write transaction log 32. Replicator 46 processes the write-data transactions stored in log 32 in much the same manner as replicator 30 described above. Replicator 46 can order dependent write-data transactions. In one embodiment, replicator 46 orders dependent write-data transactions by assigning sequence numbers thereto. In another embodiment, replicator 46 orders dependent write-data transactions by storing them in order in log 32 on a FIFO basis. Replicator 46, like replicator 30, is capable of transmitting write-data transactions either synchronously or asynchronously to the backup node 14 via link 16. In asynchronous mode, replicator 46 transmits dependent write-data transactions without the delay associated with synchronous transmission of dependent write-data transactions to back up node 14.

There is an increased data processing demand on host node 12 in FIG. 2 when compared to the data processing demand of host node 12 in FIG. 1 since host node 12 in FIG. 2 is required to process write-data transactions generated by data storage management system 44 of second node 40. This increased demand on host node 12 of FIG. 2 may cause host node 12, with its limited processing power, to act as a bottleneck to the data processing system 10 shown in FIG. 2. The bottleneck may negate the purpose of adding the second node 40.

SUMMARY OF THE INVENTION

Disclosed is a method and apparatus for replicating a data volume using a replicator device located on a communication network. In one embodiment, a first node transmits a first write-data transaction to a first data storage system and to the replicator device. A second node transmits a second write-data transaction to the first data storage device and to the replicator device. The network appliance transmits the first and second write-data transactions to a third node via a communication link for updating a replica of a data volume. The data volume is stored in the first data storage system and is updated with first and second data contained in the first and second write-data transactions, respectively. The replica of the data volume is stored in a second data storage system and is updated with the first and second data.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 3:
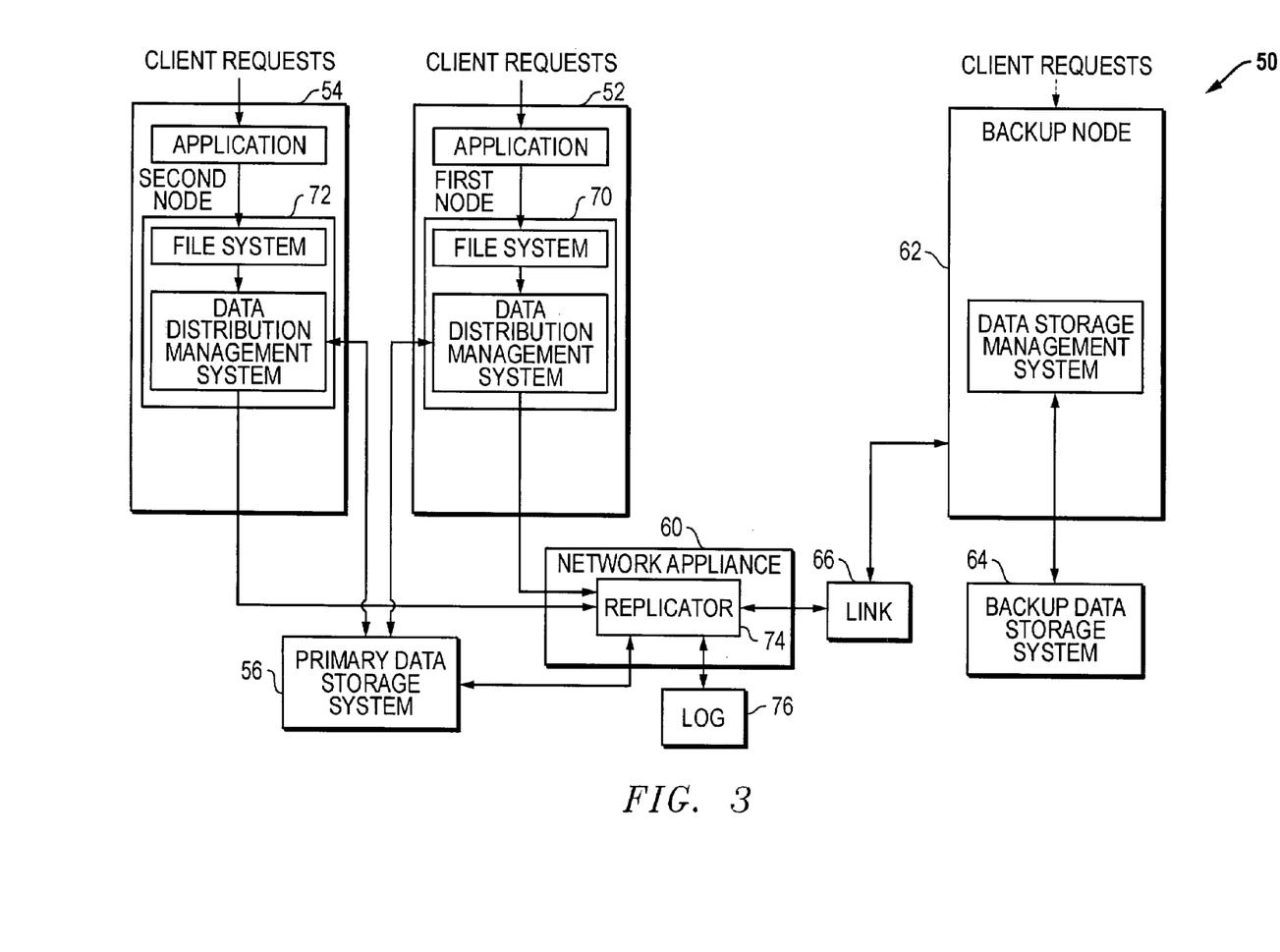
FIG. 3 is a block diagram of a data processing system employing the present invention.

The present invention relates to data volume replication using a special replicator device located in a communication network. FIG. 3 illustrates a data processing system 50 employing one embodiment of the present invention. In FIG. 3, data processing system 50 includes a first node 52 and a second node 54 coupled to a primary data storage system 56 and a network appliance 60. Additionally, data processing system 50 includes a backup node 62 coupled to the network appliance 60 via data communication link 66. Lastly, data processing system 50 includes a backup data storage system 64 coupled to backup node 62.

The term coupled devices should not be limited in definition to two devices coupled directly to each other. Two devices (e.g., first node 52 and backup node 62) may be coupled together via one or more other devices. For example, first node 52 is coupled to backup node 62 even the first node 52 and backup node 62 are coupled together via network appliance 60 and communication link 66.

Primary data storage system 56 may include one or more memory devices (not shown) that store one or more data volumes accessible by first node 52 and second node 54. A data volume is a collection of files that stores data. While it is said that files store data, in reality data is stored in the memory devices of primary data storage system 56. For purposes of explanation, it will be presumed that primary data storage system 56 includes several memory devices that store a single primary data volume, it being understood that the present invention should not be limited thereto. Backup data storage system 64 stores a copy or replica of the primary data volume. This replica is created and maintained in backup data storage system 64 as will be more fully described below.

The primary data volume stored within primary data storage system 56 may be distributed across the several memory devices thereof. Likewise, the replica of the primary data volume stored within backup data storage system 64 may be distributed across the several memory devices thereof. The memory devices within primary data storage system 56 or backup data storage system 64 may take distinct forms. For example, the memory devices may take form in one or more dynamic or static random access memories, one or more arrays of magnetic or optical data storage discs, or combinations thereof. The memory devices employed within primary data storage system 56 or backup data storage system 64 should not be limited to the foregoing hardware components. Rather, the memory devices contained within primary data storage system 56 or backup data storage system 64 may take form in any hardware, software, or combination of hardware and software in which data of a data volume may be consistently stored and accessed. The memory devices within primary data storage system 56 or backup data storage system 64 may take form in a complex construction of several hardware components operating under the direction of software.

Each of the first and second nodes 52 and 54 may take form in a server computer system executing a distributed application that receives and responds to transactional requests from client computer systems (not shown). In response to the distributed application receiving and processing the requests, each of the first and second host nodes 52 and 54 generates read or write-data transactions that read data from or write data to the data volume of primary data storage system 56. Primary data storage system 56 returns data for subsequent processing by the distributed application running on the first node 52 or second node 54 in response to receiving a read data transaction. Primary data storage system 56 may return an acknowledgement to the first node 52 or the second node 54 that data has been successfully stored in response to receiving a write-data transaction therefrom.

Backup data storage system 64 is positioned at a location remote from primary data storage system 56. Backup data storage system 64, as noted, stores a replica of the primary data volume of storage system 56. Backup node 62 may be a server computer system executing an application that receives and responds to transactional requests from client computer systems. Backup node 62 and backup data storage system 64 provide a backup source to service client computer system transactional requests should first and second nodes 54 and 52 and/or primary data storage system 56 become unusable or inaccessible due to some event such as hardware and/or software failure. For example, if primary data storage system 56 suddenly becomes corrupted or inaccessible or the site fails, all client computer system requests to read or write data can be diverted to backup node 62 for subsequent processing, or users (customers) can be diverted to a new location.

First node 52 includes a data storage management system 70 that takes form in instructions executing on one or more processors within first node 52. Similarly, second node 54 includes a data storage management system 72 that takes form in instructions executing on one or more processors within second node 54. Data management systems 70 and 72 generate the read and write-data transactions described above in response to receiving and processing read and write data requests from client computer systems. The data storage management systems 70 and 72 in combination form a distributed data management system. Backup node 62 also includes a data storage management system that takes form in instructions executing on one or more processors of backup node 62. Each of the data management systems 70 and 72 may include a file system and a system for managing the distribution of volume data across the several memory devices of primary data storage system 56. The file systems executing on nodes 52 and 54 in combination form a distributed file system. Similarly, the data volume distribution management systems executing in nodes 52 and 54 in combination form a distributed data volume distribution management system. Volume Manager™ provided by VERITAS Software Corporation of Mountain View, Calif., is an exemplary system for managing the distribution of volume data across memory devices.

Replicator device 60 may take form in any one of a number of devices that include an instruction memory and one or more processors for executing instructions stored in the instruction memory. Network appliance 60 could take form in a router or a personal computer system. Network appliance 60 includes a replicator 74 that may take form in software instructions executing on the one or more processors of network appliance 60. Replicator receives write-data transactions from nodes 52 and 54. Replicator 74 functions to create and maintain a real-time or near real-time replica of the primary data volume stored in primary data storage system 56 using the write-data transactions received from nodes 52 and 54. As noted, the replica is created and maintained in the backup data storage system 64.

Data storage management system 70 and/or data storage management system 72 transmit data-write transactions concurrently to both primary data storage system 56 and to the replicator 74 of network appliance 60. It is noted that the data transactions need not be transmitted concurrently to both primary data storage system 56 and to network appliance 60. A write-data transaction may be transmitted to both primary data storage system 56 and to network appliance 60 in a non-concurrent manner (e.g., sequentially). For purposes of explanation, it will be presumed that data transactions are transmitted concurrently to both primary data storage system 56 and to network appliance 60.

Replicator 74 may store the write-data transactions received from nodes 52 and 54, or the data thereof, in write transaction log 76. Log 76 may be a memory device internal to appliance 60. For purposes of explanation, log 76 will be described as a memory device external to appliance 60. Replicator 74 is capable of ordering dependent write-data transactions received from nodes 52 and 54. In one embodiment, replicator 74 orders dependent write-data transactions by assigning sequence numbers thereto. The sequence numbers can be stored in log 76 along with their respective write-data transactions. In another embodiment, replicator 74 can order dependent write-data transactions by storing them in log 76 in the order of their dependency on a FIFO basis. It is noted that replicator 74 is capable of ordering dependent write-data transactions using means other then those described herein.

Replicator 74 processes each logged write-data transaction, or data thereof, for transmission to backup node 62 via communication link 66 for the purpose of creating or maintaining the primary data volume replica in backup data storage system 64. Communication link 66 may take form in any kind of network link. It is noted that replicator 74 may transmit the write-data transactions themselves, or generate and transmit new transactions that contain the essential information (write data, address where the write data is to be stored, etc.) of the write-data transactions needed to update the replicated data volume. For purposes of explanation, the present invention will be described with respect to replicator 74 transmitting the write-data transactions generated by data storage management systems 70 and 72 to backup node 62 with little or no change to the write-data transactions, it being understood that the present invention should not be limited thereto.

Backup node 62 receives the write transactions transmitted by replicator 74, and the replicated volume in backup data storage system 64 is subsequently updated (i.e., data of the write-data transactions is written to the replicated data volume) in response to backup node 62 receiving the write-data transactions. In this fashion, the real-time replica of the primary data volume is maintained within backup data storage system 64.

Replicator 74 operates in synchronous or asynchronous mode or switches between synchronous and asynchronous modes in maintaining the primary data volume replica. In synchronous mode, replicator 74, in one embodiment, transmits dependent write-data transactions stored in log 76 to backup node 14 via link 16 in order of dependency in which they were stored in log 76. In synchronous mode, there is a delay between transmission of dependent write-data transactions to backup node 62. More particularly, replicator 74 delays transmission of one dependent write-data transaction to backup node 62 until a previously transmitted dependent write transaction has completed at backup storage system 64.

In asynchronous mode, replicator 74 transmits dependent write-data transactions without the delay required in synchronous transmission of dependent write transactions. In one embodiment of the asynchronous mode, replicator 74 transmits dependent write-data transactions to backup node 62 along with sequence numbers previously assigned thereto by replicator 74. Backup node 62 receives and stores the received write-data transactions along with their respectively assigned sequence numbers until they can be processed. The sequence numbers are used by backup node 14 when updating the replica volume in backup data storage system 64. In one embodiment, the replica volume is updated in an order according to the sequence number assigned to the dependent write-data transactions temporarily stored in backup node 62. Thus, the replica is updated by write-data transactions assigned lower sequence numbers before being update with write-data transactions assigned higher sequence numbers.

Replicator 74 transmits write-data transactions via communication link 66 (e.g., WAN link). If transmission latency is high over link 66 due to, for example, communication congestion or long distance communication unrelated to transmission of write-data transactions between replicator 74 and node 62, then throughput of write-data transactions between replicator 74 and backup node 62 may be slowed substantially. If throughput is slowed substantially, log 74 may fill up with write-data transactions that have yet to be transmitted to backup node 62. Conceivably, write-data transactions provided to replicator 74 from first and second nodes 54 and 52, could be dropped when log 74 fills up. When write-data transactions are dropped, the replica data volume in backup data storage system may become internally inconsistent (corrupted).

Replicator 74 could be provided with a knowledge of the virtual data structures of the primary data volume stored in primary data storage system 56 such that replicator 74 can resynchronize the primary data volume and its replica after write-data transactions are dropped due to unavailable storage space in log 76. The recovery can be initiated when one or more write-data transactions are dropped. Recovery results in the replica data volume in backup data storage system 64 being resynchronized to the primary data volume stored in primary data storage system 56 notwithstanding the write-data transactions dropped by replicator 74.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A system comprising:
   a first data storage system for storing a data volume;
   a network appliance apart from the first data storage system;
   a first node for transmitting a first write-data transaction to the first data storage system and to the network appliance, wherein the first write-data transaction comprises first data to be written to the data volume, wherein the first write-data transaction transmitted to the first data storage system is identical to the first write-data transaction transmitted to the network appliance;
   a second node for transmitting a second write-data transaction to the first data storage system and to the network appliance, wherein the second write-data transaction comprises second data to be written to the data volume, wherein the second write-data transaction transmitted to the first data storage system is identical to the second write-data transaction transmitted to the network appliance;
   wherein the network appliance is configured to transmit third and fourth write-data transactions either synchronously or asynchronously to a third node that is in data communication with a replica of the data volume, wherein the third and fourth transactions comprise the first and second data, respectively.

2. The system of claim 1 wherein the network appliance is configured to assign first and second sequence numbers to the first and second write-data transactions, respectively.

3. The system of claim 2 wherein the network appliance is configured to transmit the third and fourth write-data transactions to the third node along with the first and second sequence numbers, respectively.

4. The system of claim 2 wherein the network appliance is configured to transmit the third and fourth write-data transactions to the third node in sequence according to the first and second sequence numbers.

5. A method comprising:
   a first node transmitting a first write-data transaction to a first data storage system and separately transmitting the first write-data transaction to a network appliance, wherein the first write-data transaction comprises first data, wherein the first write-data transaction transmitted to the first data storage system is identical to the first write-data transaction transmitted to the network appliance;
   a second node transmitting a second write-data transaction to the first data storage system and separately transmitting the second write-data transaction to the network appliance, wherein the second write-data transaction comprises second data, wherein the second write-data transaction transmitted to the first data storage system is identical to the second write-data transaction transmitted to the network appliance;
   the network appliance transmitting third and fourth write-data transactions to a third node via a communication link, wherein the third and fourth write-data transactions comprise the first and second data, respectively;
   updating a data volume stored in the first data storage system with the first and second data contained in the first and second write-data transactions, respectively, wherein the first data storage system is coupled to the first and second nodes;
   updating a replica of the data volume with the first and second data, wherein the replica of the data volume is stored in a second data storage system coupled to the third node;
   wherein the network appliance transmits the first and second write-data transactions to the third node either synchronously or asynchronously.

6. A network appliance comprising:
   a first communications port configured for communication with a first node;
   a second communications port configured for communication with a second node;
   a memory;
   a transaction log stored in the memory for storing write-data transactions received from the first and second nodes via the first and second communication ports, respectively;
   a replicator configured to maintain a replica of a primary data volume in accordance with write-data transactions received from both the first and second communications ports;
   wherein the replicator is configured to assign sequence numbers to dependent write-data received from the first and second nodes via the first and second communication ports, respectively, and is further configured to operate in either an asynchronous transmission mode or a synchronous transmission mode;
   wherein the replicator, when operating in the asynchronous transmission mode, is configured to transmit dependent write-data transactions stored in the transaction log to a backup data storage system along with assigned sequence numbers, wherein the replica is stored on the backup data storage system, and
   wherein the replicator, when operating in the synchronous transmission mode, is configured to transmit dependent write-data transactions stored in the transaction log to the backup data storage system in sequence according to assigned sequence numbers.

7. The network appliance of claim 6, wherein the network appliance is comprised in a router.

8. The network appliance of claim 6, further comprising:
   a processor;
   wherein the replicator comprises software instructions stored in the memory and configured to be executed on the processor.

9. The network appliance of claim 6, wherein the replicator is configured to record the sequence numbers in the transaction log.

10. The network appliance of claim 6, wherein the replicator is configured to assign sequence numbers to dependent write-data transactions.

11. The network appliance of claim 6, further comprising:
a recovery module configured to re-synchronize the replica of the primary data volume to the primary data volume in response to dropped information in the transaction log.

12. A method comprising:
a first node transmitting a first write-data transaction to a first data storage system and separately transmitting the first write-data transaction to a network appliance;
a second node transmitting a second write-data transaction to the first data storage system and separately transmitting the second write-data transaction to the network appliance;
the network appliance updating a transaction log with the first and second write-data transactions;
the network appliance transmitting the first and second write-data transactions to a third node via a communication link;
updating a data volume stored in the first data storage system with first and second data contained in the first and second write-data transactions, respectively, wherein the first data storage system is coupled to the first and second nodes;
updating a replica of the data volume with the first and second data, wherein the replica of the data volume is stored in a second data storage system coupled to the third node;
the network appliance assigning first and second sequence numbers to the first and second write-data transactions, respectively, wherein the network appliance is configured to operate in either an asynchronous transmission mode or a synchronous transmission mode;
the network appliance recording the first and second sequence numbers in the transaction log and transmitting the first and second write-data transactions to the third node in sequence according to the first and second sequence numbers, respectively, when operating in the synchronous transmission mode; and
the network appliance transmitting the first and second write-data transactions to the third node with the first and second sequence numbers, respectively, when operating in the asynchronous transmission mode.

13. The method of claim 12 further comprising:
the first node transmitting the first write-data transaction to the first data storage system concurrently with transmitting the first write-data transaction to the network appliance;
the second node transmitting the second write-data transaction to the first data storage system concurrently with transmitting the second write-data transaction to the network appliance.

14. The method of claim 12 further comprising:
re-synchronizing the replica of the data volume to the data volume stored in the first data storage system in response to dropped information in the transaction log.

15. The method of claim 12, wherein the transaction log is stored in the network appliance.

16. A method comprising:
a first node transmitting a first write-data transaction to a first data storage system and separately transmitting the first write data transaction to a network appliance apart from the first data storage system wherein the first write-data transaction transmitted to the first data storage system is identical to the first write-data transaction transmitted to the network appliance;
updating a data volume stored in the first data storage system with first data of the first write-data transaction;
updating a replica of the data volume with first data of the first write-data transaction, wherein the replica is updated after the first write-data transaction is transmitted to the network appliance;
a second node transmitting a second write-data transaction to the first data storage system and separately transmitting the second write data transaction to the network appliance, wherein the second write-data transaction transmitted to the first data storage system is identical to the second write-data transaction transmitted to the network appliance;
updating the data volume stored in the first data storage system with second data of the second write-data transaction;
updating the replica with second data of the second write-data transaction, wherein the replica is updated after the second write-data transaction is transmitted to the network appliance;
the network appliance assigning first and second sequence numbers to the first and second write-data transactions, respectively;
the network appliance transmitting the third and fourth write-data transactions to a third node either synchronously or asynchronously, wherein the third and fourth transactions comprise the first and second data, respectively;
wherein the third node is in data communication with the replica.

17. A method comprising:
a first node transmitting a first write-data transaction to a first data storage system and separately transmitting the first write-data transaction to a network appliance, wherein the first write-data transaction comprises first data, wherein the second write-data transaction transmitted to the first data storage system is identical to the second write-data transaction transmitted to the network appliance;
a second node transmitting a second write-data transaction to the first data storage system and separately transmitting the second write-data transaction to the network appliance, wherein the second write-data transaction comprises second data, wherein the second write-data transaction transmitted to the first data storage system is identical to the second write-data transaction transmitted to the network appliance;
the network appliance storing the first and second write-data transactions in a transaction log;
the network appliance assigning first and second sequence numbers to the first and second write-data transactions;
the network appliance transmitting third and fourth write-data transactions to a third node via a communication link, wherein the third and fourth write-data transactions comprise the first and second data, respectively;

updating a data volume stored in the first data storage system with the first and second data contained in the first and second write-data transactions, respectively, wherein the first data storage system is coupled to the first and second nodes;

updating a replica of the data volume with the first and second data, wherein the replica of the data volume is stored in a second data storage system coupled to the third node, wherein the replica is contained in a second data storage system in data communication with the third node.

18. The method of claim 17 wherein the method further comprises transmitting the third and fourth write-data transactions to the third node along with the first and second sequence numbers, respectively.

19. The method of claim 17 wherein the method further comprises transmitting the third and fourth write-data transactions to the third node in sequence according to the first and second sequence numbers.

* * * * *